(12) United States Patent
Wang et al.

(10) Patent No.: US 11,240,812 B2
(45) Date of Patent: Feb. 1, 2022

(54) COMMUNICATION METHOD AND COMMUNICATIONS DEVICE

(71) Applicant: Huawei Technologies Co., Ltd., Shenzhen (CN)

(72) Inventors: Tingting Wang, Shenzhen (CN); Cunqing Hua, Shanghai (CN); Jing Liu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 3 days.

(21) Appl. No.: 16/586,234

(22) Filed: Sep. 27, 2019

(65) Prior Publication Data

US 2020/0029334 A1 Jan. 23, 2020

Related U.S. Application Data

(63) Continuation of application No. PCT/CN2018/080506, filed on Mar. 26, 2018.

(30) Foreign Application Priority Data

Mar. 31, 2017 (CN) .......................... 201710209278.3

(51) Int. Cl.
*H04W 72/04* (2009.01)
*H04L 1/16* (2006.01)
(Continued)

(52) U.S. Cl.
CPC ....... *H04W 72/0466* (2013.01); *H04L 1/1642* (2013.01); *H04W 76/15* (2018.02); *H04W 80/02* (2013.01); *H04W 80/08* (2013.01)

(58) Field of Classification Search
CPC ............... H04L 1/1896; H04L 1/1642; H04W 72/0466; H04W 76/15; H04W 80/08; H04W 80/02; H04W 72/04; H04W 72/02
(Continued)

(56) References Cited

U.S. PATENT DOCUMENTS

2015/0016426 A1* 1/2015 Merlin .................. H04L 1/0041
370/335
2015/0139227 A1* 5/2015 Kim ...................... H04L 1/1671
370/390
(Continued)

FOREIGN PATENT DOCUMENTS

CN 102572717 A 7/2012
CN 103840917 A 6/2014
(Continued)

OTHER PUBLICATIONS

Intel Corporation, "Impacts of Splitting a Single EPS Bearer between Two (or more) eNBs", 3GPP TSG RAN WG2 Meeting #81bis, R2-131401, Chicago, USA, Apr. 15-19, 2013, 10 pages.

*Primary Examiner* — Candal Elpenord
(74) *Attorney, Agent, or Firm* — Slater Matsil, LLP

(57) ABSTRACT

Embodiments of the present invention provide a communication method and a communications device. The method includes: obtaining, by a first access network device, a first data block; performing network coding on the first data block to generate a plurality of first encoded data blocks; and performing, by the first access network device, offload processing on at least one first encoded data block in the plurality of first encoded data blocks. The offload processing includes: sending a part of the at least one first encoded data block to a second access network device, and directly sending, by using an air interface, another part of the at least one first encoded data block to the terminal device.

20 Claims, 7 Drawing Sheets

(51) Int. Cl.
*H04W 76/15* (2018.01)
*H04W 80/02* (2009.01)
*H04W 80/08* (2009.01)

(58) Field of Classification Search
USPC .................................................. 370/329–330
See application file for complete search history.

(56) References Cited

U.S. PATENT DOCUMENTS

| | | |
|---|---|---|
| 2015/0208404 A1 | 7/2015 | Yie et al. |
| 2015/0358113 A1* | 12/2015 | Callard ................ H04L 1/0041 714/776 |
| 2016/0219458 A1* | 7/2016 | Kubota ............. H04W 28/0273 |
| 2016/0323065 A1 | 11/2016 | Zhu et al. |
| 2017/0006598 A1 | 1/2017 | Uemura et al. |
| 2017/0041100 A1* | 2/2017 | Xie ............................ H04L 1/00 |
| 2017/0171060 A1* | 6/2017 | Liu ........................... H04L 69/28 |
| 2017/0207880 A1* | 7/2017 | Sun ........................ H04L 1/0083 |
| 2017/0207895 A1* | 7/2017 | Yang ...................... H04L 1/1822 |
| 2018/0123747 A1* | 5/2018 | Wang ..................... H04L 5/0051 |
| 2018/0270799 A1* | 9/2018 | Noh ....................... H04L 5/0094 |

FOREIGN PATENT DOCUMENTS

| | | | |
|---|---|---|---|
| CN | 103858352 A | 6/2014 | |
| CN | 104753627 A | 7/2015 | |
| CN | 105594164 A | 5/2016 | |
| EP | 3073661 A1 | 9/2016 | |
| EP | 3447943 A1 * | 2/2019 | ........... H04L 1/0041 |
| EP | 3447943 A1 | 2/2019 | |
| EP | 3576329 A1 * | 12/2019 | ........... H04L 1/1642 |
| WO | 2016045810 A1 | 3/2016 | |
| WO | 2016105570 A1 | 6/2016 | |

* cited by examiner

COMMUNICATION METHOD AND COMMUNICATIONS DEVICE

CROSS-REFERENCE TO RELATED APPLICATIONS

This application is a continuation of International Application No. PCT/CN2018/080506, filed on Mar. 26, 2018, which claims priority to Chinese Patent Application No. 201710209278.3, filed on Mar. 31, 2017. The disclosures of the aforementioned applications are hereby incorporated by reference in their entireties.

TECHNICAL FIELD

Embodiments of the present invention relate to the field of communications technologies, and in particular, to a communication method and a communications device.

BACKGROUND

Currently, a dual-connectivity (DC) scenario is introduced in $3^{rd}$ Generation Partnership Project Release 12 (3GPP R12), that is, user equipment (UE) performs data transmission with two evolved NodeBs (eNBs). As shown in FIG. 1, user equipment performs user plane data transmission with a macro eNodeB (MeNB) and a small eNodeB (SeNB).

In this case, the UE needs to separately access the MeNB and the SeNB. For a control plane (CP), the UE only needs to establish a radio resource control (RRC) connection to the MeNB. For a user plane (UP), $_3$C is adopted as an offloading scheme for user plane data transmission. The DC $_3$C offloading scheme is shown in FIG. 2. A serving gateway (S-GW) transmits user plane data to an MeNB through an $S_1$ interface, and a packet data convergence protocol (PDCP) layer in the MeNB offloads a part of the user plane data to a radio link control (RLC) layer of the SeNB through an Xn interface. That is, the user plane data is offloaded into two pails, which are respectively sent to the UE by using the MeNB and the SeNB.

In addition, because signal quality of an access link between the MeNB and the UE is different from signal quality of an access link between the SeNB and the UE, delays in which the user plane data arrives at the UE is also different. Therefore, a case in which data sent first does not arrive, but the data sent later has arrived may occur. To ensure that the UE receives in sequence, the PDCP layer of the UE needs to enable a reordering function to reorder data received through different links, and then sends the received data to an Internet protocol (IP) layer in sequence.

However, when the signal quality of the access link between the MeNB and the UE is greatly different from the signal quality of the access link between the SeNB and the UE, the UE reordering requires a relatively long waiting delay. In addition, poor channel quality may cause a data loss, and the MeNB and the SeNB need to retransmit data, moreover, poor channel quality may cause the UE to require an extra waiting delay. In both cases, a transmission delay of the user plane data is increased, and a throughput of the UE is reduced.

SUMMARY

This application provides a communication method and a communications device. The method can shorten a data transmission delay in a dual-connectivity scenario and improve a throughput of a terminal device.

A first aspect of this application provides a communication method. The method includes obtaining, by a first access network device, a first data block. The method also includes performing, by the first access network device, network coding on the first data block to generate a plurality of first encoded data blocks. The method also includes performing, by the first access network device, offload processing on at least one first encoded data block in the plurality of first encoded data blocks. The offload processing includes: sending a part of the at least one first encoded data block to a second access network device, and directly sending, by using an air interface, another part of the at least one first encoded data block to the terminal device.

In a possible implementation, the first access network device performs offload processing on at least one first encoded data block in the plurality of first encoded data blocks. The offload processing specifically includes: sending a part of the at least one first encoded data block to a second access network device, and directly sending, to the terminal device by using an air interface, a remaining first encoded data block in the at least one first encoded data block except the part that is sent to the second access network device.

In a possible implementation, the network coding includes fountain code coding.

In a possible implementation, the first access network device performs the network coding on the first data block at a packet data convergence protocol layer to generate the plurality of first encoded data blocks.

In a possible implementation, the first access network device performs the network coding on the first data block at a dual-connectivity rateless coding layer to generate the plurality of first encoded data blocks, where the dual-connectivity rateless coding layer is between a radio link control layer and the packet data convergence protocol layer.

In a possible implementation, the performing, by the first access network device, network coding on the first data block to generate a plurality of first encoded data blocks includes: if a data volume of data packets received by the first access network device is greater than a second threshold K, using, by the first access network device, one or more of the data packets as the first data block, and performing the network coding on the first data block, where a data volume of the first data block is less than or equal to K; or if a data volume of data packets received by the first access network device is greater than the first threshold and is less than or equal to a second threshold K, using, by the first access network device, the data packets as the first data block, and performing the network coding on the first data block. In this case, if the network coding is performed on all received data packets, a waiting coding delay of the first access network device is relatively long, and decoding time of the terminal device is also increased, thereby reducing efficiency of entire network coding. In this case, the first access network device controls the data volume of the data for network coding, thereby improving the network coding efficiency and further improving transmission efficiency.

In a possible implementation, the method further includes: after the first access network device receives a first feedback message sent by the terminal device, or after the first access network device sends a first quantity of the first encoded data blocks, obtaining, by the first access network device, a second data block; and performing, by the first access network device, the network coding on the second data block to obtain a plurality of second encoded data blocks, and buffering the plurality of second encoded data blocks. The dual-connectivity rateless coding layer includes a first buffer and a second buffer. The first buffer is configured to buffer the first encoded data block, and the second buffer is configured to buffer the second encoded data block. In this case, encoded data blocks are transmitted between the second access network device and the terminal device throughout an entire process, thereby preventing a link from becoming idle between the second access network device and the terminal device, shortening the transmission delay, improving the transmission efficiency, and further increasing a throughput of the terminal device.

In a possible implementation, the method further includes: receiving, by the first access network device, a second feedback message sent by the terminal device; and stopping sending, by the first access network device, the first encoded data block, and starting to send the second encoded data block, where the second feedback message is used to indicate that the terminal device has correctly decoded the first encoded data block.

In a possible implementation, that the first access network device performs the network coding on the first data block at a packet data convergence protocol layer to generate the plurality of first encoded data blocks includes: after performing the network coding on the first data block, adding, by the first access network device, a first sequence number to obtain the plurality of first encoded data blocks, where the plurality of first encoded data blocks have the same first sequence number. In this case, the sequence number facilitates distinguishing the first encoded data block.

In a possible implementation, the method further includes: after receiving third feedback information sent by the terminal device, or after sending a first quantity of the first encoded data blocks, obtaining, by the first access network device, a second data block; performing, by the first access network device, the network coding on the second data block, and adding a second sequence number to obtain a plurality of third encoded data blocks; and sending, by the first access network device, the plurality of third encoded data blocks to the terminal device, where the plurality of third encoded data blocks have the same second sequence number. The packet data convergence protocol layer includes a third buffer and a fourth buffer. The third buffer buffers the first encoded data block, and the fourth buffer buffers the third encoded data block. In this case, encoded data blocks are transmitted between the second access network device and the terminal device throughout an entire process, thereby preventing a link from becoming idle between the second access network device and the terminal device, shortening the transmission delay, improving the transmission efficiency, and further increasing the throughput of the terminal device.

In a possible implementation, the method further includes: receiving, by the first access network device, a fourth feedback message sent by the terminal device; and in response to the fourth feedback message, stopping sending, by the first access network device, the first encoded data block or the third encoded data block, where the fourth feedback message is used to indicate that the terminal device has correctly decoded the first encoded data block or the third encoded data block.

In a possible implementation, the network coding is transmitted in a manner of an unacknowledged mode at a radio link control layer.

In a possible implementation, the first access network device sends a feedback message to the second access network device, so that the second access network device processes the received first encoded data block and third encoded data block. For example, the second access network device buffers the received first encoded data block or third encoded data block, or the second access network device sends the received first encoded data block or third encoded data block to the terminal device. The feedback message may be carried and sent in a control plane message, or may be carried and sent in a sending process of the first encoded data block or the third encoded data block.

In a possible implementation, during uplink transmission, the first access network device receives at least one fifth encoded data block sent by the terminal device; the first access network device receives at least one seventh encoded data block sent by the terminal device; and the first access network device decodes the at least one fifth encoded data block and the at least one seventh encoded data block to obtain a first data block.

In a possible implementation, the fifth encoded data block and the seventh encoded data block are obtained by performing the network coding on the first data block; or the fifth encoded data block and the seventh encoded data block are obtained by performing the network coding on the first data block and adding a first sequence number.

In a possible implementation, when the first access network device receives a first quantity of the fifth encoded data blocks and/or the seventh encoded data blocks, the first access network device sends a first feedback message to the terminal device. When the first access network device decodes the fifth encoded data block and/or the seventh encoded data block, and obtains the first data block, the first access network device sends a second feedback message to the terminal device.

A second aspect of this application provides a communication method. The method includes: receiving, by a terminal device, at least one fifth encoded data block sent by a first access network device. The method also includes receiving, by the terminal device, at least one seventh encoded data block sent by a second access network device. The method also includes decoding, by the terminal device, the at least one fifth encoded data block and/or the at least one seventh encoded data block, to obtain a first data block.

In a possible implementation, the fifth encoded data block and the seventh encoded data block are obtained by performing network coding on the first data block; or the fifth encoded data block and the seventh encoded data block are obtained by performing the network coding on the first data block and adding a first sequence number.

In a possible implementation, the method further includes: when the terminal device receives a preset quantity of the fifth encoded data blocks and/or the seventh encoded data block, sending, by the terminal device, a first feedback message to the first access network device; or when the terminal device decodes the fifth encoded data block and/or the seventh encoded data block, and obtains the first data block, sending, by the terminal device, a second feedback message to the first access network device.

In a possible implementation, the network device includes fountain code coding.

In a possible implementation, during uplink transmission, the terminal device obtains a first data block; performs the network coding on the first data block to generate a plurality of first encoded data blocks; and offloads at least one first encoded data block in the plurality of first encoded data blocks, where a part of the at least one first encoded data block is sent to a second access network device, and another part of the at least one first encoded data block is sent to a first access network device.

In a possible implementation, the terminal device performs the network coding on the first data block at a packet data convergence protocol layer to generate the plurality of first encoded data blocks.

In a possible implementation, the terminal device performs the network coding on the first data block at a dual-connectivity rateless coding layer to generate the plurality of first encoded data blocks, where the dual-connectivity rateless coding layer is between a radio link control layer and the packet data convergence protocol layer.

In a possible implementation, when the terminal device sends a first quantity of first encoded data blocks, or when the terminal device receives a first feedback message sent by the first access network device, the terminal device obtains a second data block. The terminal device performs the network coding on the second data block to obtain a plurality of second encoded data blocks. The terminal device buffers the first encoded data block in a first buffer, and buffers the second encoded data block in a second buffer. In this case, the terminal device performs the network coding at the dual-connectivity rateless coding layer.

In a possible implementation, the terminal device receives a second feedback message sent by the first access network device. The terminal device stops sending the first encoded data block, and starts to send the second encoded data block. In this case, the terminal device clears the first encoded data block buffered in the first buffer.

In a possible implementation, after performing the network coding on the first data block, the terminal device adds a first sequence number to obtain the plurality of first encoded data blocks. When the terminal device sends a first quantity of first encoded data blocks, or when the terminal device receives a third feedback message sent by the first access network device, the terminal device obtains a second data block. The terminal device performs the network coding on the second data block and adds a second sequence number to obtain a plurality of third encoded data blocks. The terminal device buffers the first encoded data block in a third buffer, and buffers the third encoded data block in a fourth buffer. In this case, the terminal device performs the network coding at the packet data convergence protocol layer.

In a possible implementation, the terminal device receives a fourth feedback message sent by the first access network device. The terminal device stops sending the first encoded data block or the third encoded data block.

According to still another aspect, an embodiment of the present invention provides a terminal device. The terminal device may implement functions implemented by the terminal device in the foregoing implementations, and the functions may be implemented by using hardware, or may be implemented by hardware executing corresponding software. The hardware or the software includes one or more modules corresponding to the foregoing functions.

In a possible design, a structure of the terminal device includes a processor and a transceiver. The processor is configured to support the terminal device in performing a corresponding function in the foregoing method. The transceiver is configured to support communication between the terminal device and an access network device. The terminal device may further include a memory. The memory is configured to: couple to the processor, and store a program instruction and data that are necessary for the terminal device.

According to still another aspect, an embodiment of the present invention provides an access network device. The access network device has functions of implementing behaviors of the access network device in the foregoing implementations. The functions may be implemented by hardware, or may be implemented by hardware executing corresponding software. The hardware or the software includes one or more modules corresponding to the foregoing functions.

In a possible design, the access network device includes a processor. The processor is configured to support the access network device in performing a corresponding function in the foregoing method. Further, the access network device may include a communications interface. The communications interface is configured to support communication with a terminal device. Further, the access network device may include a memory. The memory is configured to: couple to the processor, and store a program instruction and data that are necessary for the access network device.

In yet another aspect, an embodiment of the present invention provides a computer storage medium, configured to store computer software instructions used by the foregoing terminal device. The computer software instructions include a program designed for executing the foregoing aspects.

In yet another aspect, an embodiment of the present invention provides a computer storage medium, configured to store computer software instructions used by the foregoing access network device. The computer storage medium contains a program designed for executing the foregoing aspects.

In yet another aspect, an embodiment of the present invention provides a computer program product that includes an instruction. When the program is executed by a computer, the instruction enables the computer to perform a function performed by the terminal device in the foregoing method design.

According to yet another aspect, an embodiment of the present invention provides a computer program product that includes an instruction. When the program is executed by a computer, the instruction enables the computer to perform a function performed by the access network device in the foregoing method design.

The embodiments of the present invention can shorten a data transmission delay in a dual-connectivity scenario and improve a throughput of the terminal device.

DETAILED DESCRIPTION OF ILLUSTRATIVE EMBODIMENTS

Figure 1:
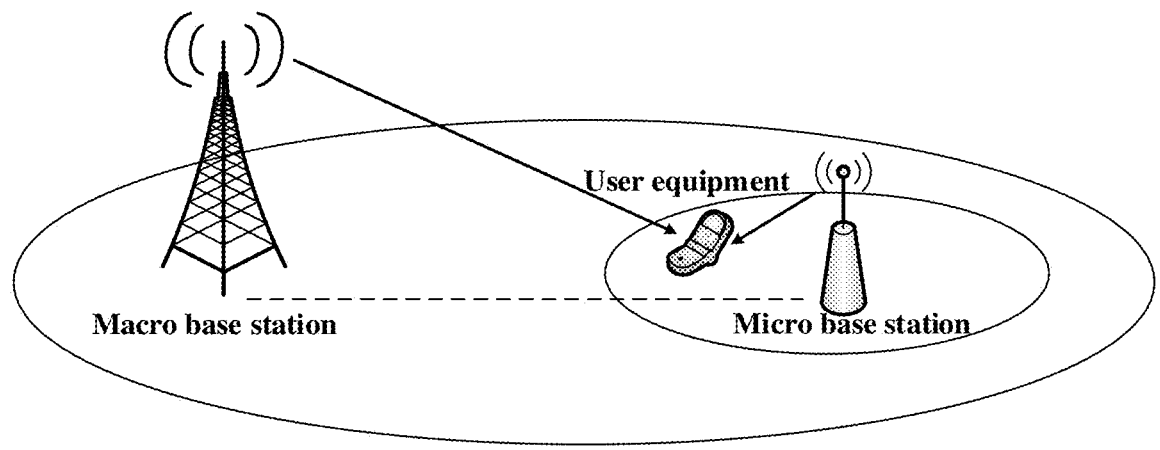
FIG. 1 is a schematic diagram of communication in a dual-connectivity scenario.
Figure 2:
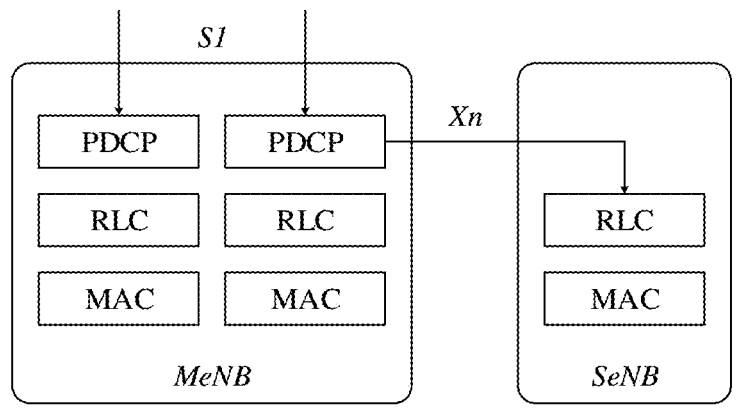
FIG. 2 is a schematic diagram of user-plane data offloading in a dual-connectivity scenario.

The terms used in embodiments of the present invention are merely for the purpose of illustrating specific embodiments, and are not intended to limit the present invention. The terms "a", "said" and "the" of singular forms used in the embodiments and the appended claims of the present invention are also intended to include plural forms, unless otherwise specified in the context clearly. It should also be noted that, the term "and/or" used herein indicates and includes any or all possible combinations of one or more associated listed items. In addition, "first" and "second" in this specification are also intended to distinguish between technical nouns, to facilitate understanding by the reader, and should not be construed as a limitation on the technical terms, and should not be construed as a limitation on a sequence.

The following describes the technical solutions in the embodiments of the present invention with reference to the accompanying drawings in the embodiments of the present invention.

A terminal device (Terminal Equipment, TE) involved in the embodiments of the present invention may also be referred to as user equipment (UE). The terminal device may include a mobile phone, a tablet computer, a personal digital assistant (PDA), a point of sales (POS), an in-vehicle computer, and the like. This is not limited in the embodiments of the present invention. For ease of description, in the embodiments of the present invention, the foregoing devices are collectively described as the terminal device.

An access network device may be an apparatus deployed in a radio access network to provide a wireless communication function for a terminal device or a relay terminal device. The apparatus may include various forms of macro base stations (Macro eNode B, MeNB), micro base stations (Small eNode B, SeNB), relay stations, access nodes (ANs), and the like. In systems that use different radio access technologies, names of devices that have a base station function may be different. For example, in an LTE network, the device is referred to as an evolved NodeB (eNB or eNodeB); in a 3$^{rd}$ generation 3G network, the device is referred to as a NodeB; and in a new radio (NR) network, the device is referred to as a gNB. For ease of description, in the embodiments of the present invention, all the foregoing apparatuses that provide a wireless communication function for the terminal device are referred to as an access network device.

In the embodiments of the present invention, user plane data may be offloaded and sent after network coding is performed at a packet data convergence protocol (PDCP) layer of an access network device. Alternatively, a dual-connectivity rateless coding (DCRC) layer may be added between an existing PDCP layer and radio link control (RLC) layer of the access network device, and a plurality of encoded data blocks are obtained after the network coding is performed on the user plane data by using the DCRC layer, at least one encoded data block in the plurality of encoded data blocks is offloaded and sent, where a part of the at least one encoded data block is sent to a terminal device by using another access network device; and another part of the at least one encoded data block is directly sent to the terminal device. After the access network device performs the network coding on data, the terminal device receives the data on which the network coding is performed, and the PDCP layer of the terminal device can directly decode the data on which the network coding is performed without enabling a reordering function, thereby reducing a waiting delay of reordering of the terminal device, shortening a data transmission delay in the dual-connectivity scenario, and improving a throughput of the terminal device.

It should be noted that the network coding includes physical network coding (Physical NC), exclusive OR (XOR), random linear network coding (RLNC), fountain code coding, and the like. The physical network coding uses mapping and signal processing to achieve an exclusive OR effect. In this embodiment of the present invention, the network coding is described by using fountain code coding as an example, but a type of the network coding is not limited.

Figure 3:
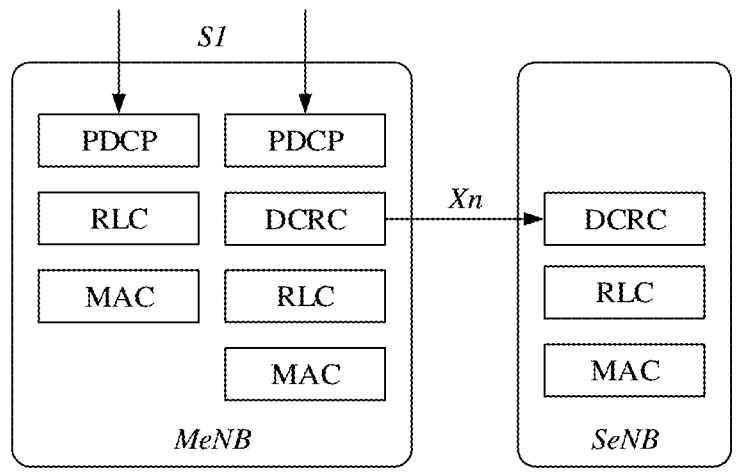
FIG. 3 is a schematic diagram of user-plane data offloading according to an embodiment of the present invention.

Downlink data transmission is used as an example. As shown in FIG. 3, FIG. 3 is a schematic diagram of user-plane data offloading in a dual-connectivity scenario according to an embodiment of the present invention. A DCRC layer is added to an access network device (an MeNB shown in the figure). In this embodiment of the present invention, the access network device may use an RRC message, a medium access control (MAC) control element (CE), or a 1 bit field reserved at a MAC layer header field during data transmission to indicate whether the network coding is performed on data received by UE, so that the terminal device can learn of and perform corresponding processing.

In addition, in this embodiment of the present invention, the data on which the network coding is performed is transmitted in a manner of an unacknowledged mode UM at an RLC layer. The UM mode, that is, an unacknowledged mode, provides a unidirectional data transmission service. The UM mode is mainly used for real-time application of delay sensitiveness and tolerance errors.

It should be noted that how the access network device performs offloading transmission on the data on which the network coding is performed is not described in this embodiment of the present invention.

Figure 4:
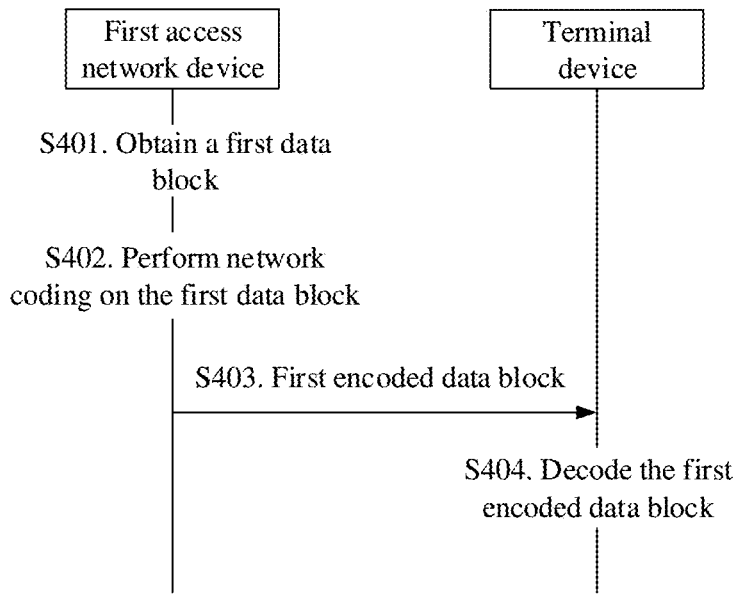
FIG. 4 is a schematic flowchart of a communication method according to an embodiment of the present invention.

FIG. 4 is a schematic flowchart of a communication method according to an embodiment of the present invention. As shown in FIG. 4, the method may include steps S401 to S404.

S401. A first access network device obtains a first data block.

In an example, the first access network device may limit a size of data on which the network coding is to be performed, to improve network coding efficiency. If a data volume of data packets received by the first access network device is less than or equal to a first threshold, the data packet is used as the first data block, and the network coding is not performed on the first data block. If a data volume of data packets received by the first access network device is greater than a second threshold K, the first access network device uses one or more of the data packets as the first data block, and performs the network coding on the first data block, where a data volume of the first data block is less than or equal to K. For example, in terms of the data packets received by the first access network device, first one or more data packets are determined as the first data block in sequence. For example, if a defined value of K is 100 bits, three data packets are received, where a size of the first data packet is 50 bits, a size of the second data packet is 40 bits, and a size of the third data packet is 40 bits, the first data block is formed by only the first data packet and the second data packet, and the third data packet and a subsequently received data packet form a second data block. If a data volume of data packets received by the first access network device is greater than the first threshold and is less than or equal to the second threshold K, the first access network device uses the data packets as the first data block, and performs the network coding on the first data block.

In an example, the first access network device performs the network coding at a DCRC layer, where the DCRC layer is between a PDCP layer and an RLC layer. After the first access network device receives a first feedback message sent by the terminal device, or after the first access network device sends a first quantity of the first encoded data blocks, the first access network device obtains a second data block Then, the first access network device performs the network coding on the second data block to obtain a plurality of second encoded data blocks, sends a part of the second encoded data blocks to a second access network device in advance, and sends another part of the second encoded data blocks to the second buffer for buffering. The DCRC layer of the first access network device includes a first buffer and a second buffer. The first buffer is configured to buffer the first encoded data block, and the second buffer is configured to buffer the second encoded data block.

At the DCRC layer, the first buffer is a primary transmit buffer (PTB), and is configured to buffer the first encoded data block obtained after the network coding is performed on the first data block. The second buffer is a secondary transmit buffer (STB), and is configured to buffer the second encoded data block obtained after the network coding is performed on the second data block. Only when receiving the first feedback message or after sending the first quantity of first encoded data blocks, the first access network device may start to obtain the second data block, perform the network coding on the second data block, and offload a part of network-coded encoded data blocks to the second access network device for storage. In addition, the first access network device further needs to send a feedback message to the second access network device, so that the second access network device buffers the received second encoded data block. The feedback information may be carried and sent in a control plane message, for example, RRC signaling or MAC CE; or the feedback information may be carried and sent in a sending process of the second encoded data block.

It should be noted that the first feedback message indicates that the first access network device may obtain the second data block, and perform the network coding on the second data block in advance. The first feedback message includes a plurality of representation forms. For example, when the first feedback message is an indication indication and a value of the indication indication is 1, it indicates that the first access network device starts to obtain the second data block, and precodes the second data block in advance. For another example, if the terminal device may correctly decode the first data block by three more first encoded data blocks, the terminal device feeds back 3. For another example, the terminal device feeds back a quantity of received first encoded data blocks, and the first access network device may estimate, based on the quantity of the first encoded data blocks correctly received by the UE, a quantity of encoded data blocks that are needed to correctly decode the data blocks. In this case, the first access network device can obtain the second data block in advance and precodes the second data block in advance. Representation forms of feedback messages are not limited in the embodiments of the present invention.

In the foregoing process, after the first access network device sends the first quantity of first encoded data blocks, it may be considered that the terminal device can complete most decoding. For example, it is considered that 80% decoding has been completed, and several encoded data blocks are needed to successfully perform decoding.

In addition, the second access network device sends some first encoded data blocks to the terminal device, and simultaneously receives some second encoded data blocks that are obtained after the network coding and that are sent by the first access network device. The second access network device buffers the second encoded data blocks in the STB. When receiving the second feedback message sent by the terminal device, the second access network device stops sending the first encoded data block and starts to send the second encoded data block, thereby preventing a link from becoming idle between the second access network device and the terminal device.

In addition, after receiving the second feedback message sent by the terminal device, the first access network device stops sending the first encoded data block, clears the first encoded data block in the first buffer, and starts to send the second encoded data block.

Therefore, in this embodiment of the present invention, a problem that no encoded data block can be transmitted before the second access network device receives a new encoded data block from the first access network device due to a delay of an X2 interface between the first access network device and the second access network device can be resolved. Further, the air interface of the link between the second access network device and the terminal device is not in an idle state, thereby avoiding a waste of air interface resources.

In another example, the first access network device performs the network coding at the PDCP layer. After performing the network coding on the first data block, the first access network device adds a first sequence number (that is, a PDCP sequence number) to generate a plurality of first encoded data blocks. The plurality of first encoded data blocks have the same PDCP sequence number.

In this case, when the first access network device receives third feedback information sent by the terminal device, or when the first access network device sends a first quantity of the first encoded data blocks, the first access network device obtains a second data block, performs the network coding on the second data block, and adds a second sequence number (that is, a PDCP sequence number) to obtain a plurality of third encoded data blocks. The plurality of third encoded data blocks have the same PDCP sequence number.

At the PDCP layer, the PTB buffers the first encoded data block, that is, an encoded data block obtained by performing network coding on the first data block, and adding the first sequence number. The STB buffers the third encoded data block, that is, an encoded data block obtained by performing network coding on the second data block, and adding the second sequence number. When receiving the third feedback message or sending the first quantity of first encoded data blocks, the first access network device starts to obtain a next data block, that is, the second data block. After performing the network coding on the second data block, the first access network device obtains a plurality of third encoded data blocks, directly sends a part of at least one third encoded data block in the plurality of third encoded data blocks to the terminal device, and sends another part of the at least one third encoded data block in the plurality of third encoded data blocks to the second access network device. In addition, the first access network device further needs to send a piece of feedback information to the second access network device, so that the second access network device can send the received third encoded data to the terminal device. The feedback information may be carried and sent in a control plane message, for example, RRC signaling or MAC CE; or may be carried and sent in a sending process of the third encoded data block.

In the foregoing process, after the first access network device sends the first quantity of first encoded data blocks, it may be considered that the terminal device can complete most decoding. For example, it is considered that 80% decoding has been completed, and several encoded data blocks are needed to successfully perform decoding.

At the same time, when sending the first encoded data block to the terminal device, the second access network device further sends the third encoded data block received from the first access network device to the terminal device.

In addition, the first access network device receives a fourth feedback message sent by the terminal device. The fourth feedback message is used to indicate that the terminal device has finished decoding the first encoded data block or the third encoded data block, and has obtained the first data block or the second data block. In this case, in response to the fourth feedback message, the first access network device stops sending the first encoded data block or the third encoded data block.

Therefore, in this embodiment of the present invention, a problem that no encoded data block can be transmitted before the second access network device receives a new encoded data block from the first access network device due to a delay of an X2 interface between the first access network device and the second access network device is resolved. Therefore, the air interface of the link between the second access network device and the terminal device is not in an idle state, thereby avoiding a waste of air interface resources.

It should be noted that, when performing the network coding at the PDCP layer, the first access network device may consider a case in which the first encoded data block and the third encoded data block are simultaneously transmitted, that is, different PDCP sequence numbers (SNs) are added to the first encoded data block and the third encoded data block, so that the terminal device can distinguish the first encoded data block from the third encoded data block, and further perform decoding. In addition, the first access network device at the PDCP layer may consider transmitting the first encoded data block and the third encoded data block in sequence, that is, a transmit end can start to send the third encoded data block only after the first encoded data block is correctly decoded by a receive end. Similarly, when performing the network coding at the DCRC layer, the first access network device may consider simultaneously transmitting the first encoded data block and the second encoded data block, or may consider transmitting the first encoded data block and the second encoded data block in sequence. This is not limited in this embodiment of the present invention.

S402. The first access network device performs the network coding on the first data block to obtain a plurality of first encoded data blocks.

A fountain code encoding principle is used as an example for description. A first data block to be transmitted by fountain code is used as an object, and is divided into $Z \geq 1$ small data blocks. Each small data block is divided into K source symbols with T bytes. Based on the K source symbols, a fountain code encoder of the access network device may produce any quantity of encoded packets, where the first encoded data block refers to an encoded packet herein. All source symbols can be successfully restored at a high probability by means of decoding provided that the terminal device receives any K $(1+\varepsilon)$ encoded packets, where $\varepsilon$ is any non-negative constant. Therefore, the terminal device may directly decode any received K$(1+\varepsilon)$ encoded packets, to obtain all the source symbols, and further obtain the first data block. The PDCP layer of the terminal device does not need to enable a reordering function, that is, the PDCP layer of the terminal device does not need to receive an ordered data sequence. The first data block can be obtained by decoding provided that a sufficient quantity of encoded packets are received. In addition, feedback and retransmission of the first access network device and the second access network device are not required, thereby shortening a data transmission delay in a dual-connectivity scenario and improving a throughput of the terminal device. Z and K are positive integers.

S403. The first access network device performs offload processing on at least one first encoded data block in the plurality of first encoded data blocks, where a part of the first encoded data block in the at least one first encoded data block is sent to the second access network device, and another part of the first encoded data block in the at least one first encoded data block is sent to the terminal device.

In this step, after receiving a part of the at least one first encoded data block, the second access network device forwards the part of the at least one first encoded data block to the terminal device.

Further, the first access network device sends the part of the first encoded data block in the at least one first encoded data block to the second access network device, and directly sends, to the terminal device by using an air interface, a remaining first encoded data block in the at least one first encoded data block except the part that is sent to the second access network device.

Optionally, the first access network device sends the part of the first encoded data block in the at least one first encoded data block to the second access network device for many times, where a quantity of first data encoded blocks sent each time is the same.

Optionally, the first access network device sends the another part of the first encoded data block in the at least one first encoded data block to the terminal device for many times, where a quantity of first data encoded blocks sent each time is the same.

It should be noted that a person skilled in the art may clearly define that each encoded data block is a whole. The description of "part" and "another part" mentioned in the embodiments of the present invention is not to split an encoded data block into a plurality of parts but to divide at least one encoded data block into a plurality of parts in quantity.

In this embodiment of the present invention, in a dual-connectivity DC scenario, the first access network device determines whether the network coding needs to be performed in terms of a total data volume of all received data packets. If necessary, the first access network device determines a data packet that needs the network coding as the first data block, and performs the network coding on the first data block. For example, the first access network device obtains first ten encoded data blocks of generated encoded data blocks in sequence, and sends the first ten encoded data blocks to the terminal device by using the second access network device; and obtains the $11^{th}$ to $13^{th}$ encoded data blocks and directly sends the $11^{th}$ to $13^{th}$ encoded data blocks to the terminal device. If the first access network device does not receive acknowledgement (ACK) feedback from the terminal device, the first access network device continues to send the $14^{th}$ to $24^{th}$ encoded data blocks to the terminal device by using the second access network device, and directly sends the $25^{th}$ to $27^{th}$ data blocks to the terminal device, until the first access network device receives the ACK that is fed back by the terminal device. The first access network device receives the ACK that is fed back by the terminal device, that is, the terminal device has successfully decoded and obtained the data packet.

S404. The terminal device decodes the received first encoded data block.

In this step, the terminal device receives the part of the first encoded data block in the at least one first encoded data block sent by the first access network device in step S403. The terminal device receives the another part of the first encoded data block in the at least one first encoded data block sent by the second access network device in step S403. To simplify and distinguish first encoded data blocks received from the first access network device and the second access network device, subsequently, the first encoded data block received by the terminal device from the first access network device is referred to as at least one fifth encoded data block, and the first encoded data block received by the terminal device from the second access network device is referred to as at least one seventh encoded data block. The terminal device decodes the at least one fifth encoded data block and/or the at least one seventh encoded data block to obtain the first data block.

In this case, the fifth encoded data block and the seventh encoded data block are obtained by performing the network coding on the first data block; or the fifth encoded data block and the seventh encoded data block are obtained by performing the network coding on the first data block and adding a first sequence number. In other words, the fifth encoded data block and the seventh encoded data block can only be one of the cases.

In an example, the DCRC layer of the terminal device receives encoded data on which the network coding is performed, where the DCRC layer is between the PDCP layer and the RLC layer. When the terminal device receives a first quantity of the fifth encoded data blocks and/or the seventh encoded data blocks, the terminal device sends a first feedback message to the first access network device, so that the first access network device obtains a second data block and performs the network coding on the second data block to obtain a plurality of sixth encoded data blocks, and sends a generated part of the sixth encoded data blocks to the second access network device for buffering.

In addition, when the terminal device decodes the fifth encoded data block and the seventh encoded data block to obtain the first data block, the terminal device sends a second feedback message to the first access network device, so that the first access network device stops sending the fifth encoded data block, and starts to send the sixth encoded data block. In addition, the terminal device sends a second feedback message to the second access network device, so that the second access network device stops sending the seventh encoded data block and starts to send the sixth encoded data block.

In another example, the PDCP layer of the terminal device receives encoded data on which the network coding is performed. When the terminal device receives a first quantity of the fifth encoded data blocks and/or the seventh encoded data blocks, the terminal device sends a third feedback message to the first access network device, so that the first access network device obtains a second data block and performs the network coding on the second data block; and adds a second sequence number to obtain a plurality of eighth encoded data blocks.

In addition, when the terminal device decodes the fifth encoded data block or the seventh encoded data block to obtain the first data block or the second data block, the terminal device sends the fourth feedback message to the first access network device, so that the first access network device stops sending the fifth encoded data block or the eighth encoded data block. In addition, the terminal device sends the fourth feedback message to the second access network device, so that the second access network device stops sending the seventh encoded data block.

Similarly, during uplink data transmission, the terminal device may obtain a first data block from to-be-sent uplink data; performs the network coding on the first data block to generate a plurality of first encoded data blocks; and offloads at least one first encoded data block in the plurality of first encoded data blocks, where a part of the at least one first encoded data block is sent to a second access network device, and another part of the at least one first encoded data block is sent to a first access network device.

In an example, the terminal device performs the network coding at the DCRC layer. When the terminal device sends a first quantity of first encoded data blocks, or when the terminal device receives the first feedback message sent by the first access network device, the terminal device obtains a second data block. In this case, the terminal device performs the network coding on the second data block, to obtain a plurality of second encoded data blocks, and buffers the plurality of second encoded data blocks. When the terminal device receives a second feedback message sent by the first access network device, the terminal device stops sending the first encoded data block, and starts to send the second encoded data block.

In another example, the terminal device performs the network coding at the PDCP layer. After performing the network coding on the first data block, the terminal device adds the first sequence number to obtain a plurality of first encoded data blocks. When the terminal device sends a first quantity of first encoded data blocks, or when the terminal device receives the third feedback message sent by a first access network device, the terminal device obtains a second data block. In this case, the terminal device performs the network coding on the second data block, and adds the second sequence number to obtain a plurality of third encoded data blocks. When the terminal device receives the fourth feedback message sent by the first access network device, the fourth feedback message indicates that the first access network device has decoded the first encoded data block or the third encoded data block, and has obtained the first data block or the second data block. In this case, the terminal device stops sending the first encoded data block or the third encoded data block.

For uncompleted matters in this embodiment of the present invention, reference may be made to a network coding process of the foregoing FIG. 4 and the text part, and details are not described herein again.

Figure 5A:
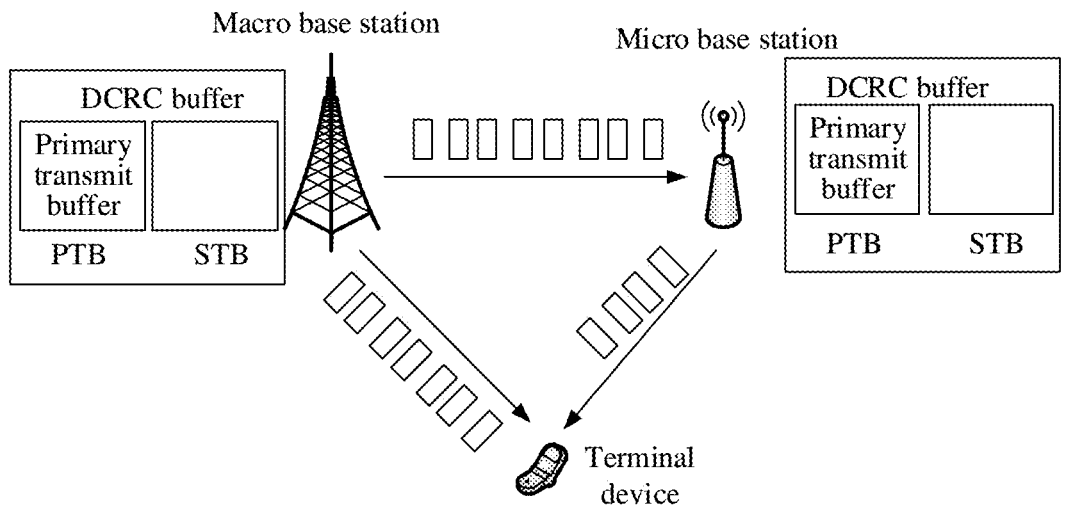
FIG. 5a is a schematic diagram of an encoding procedure at a DCRC layer according to an embodiment of the present invention.
Figure 5B:
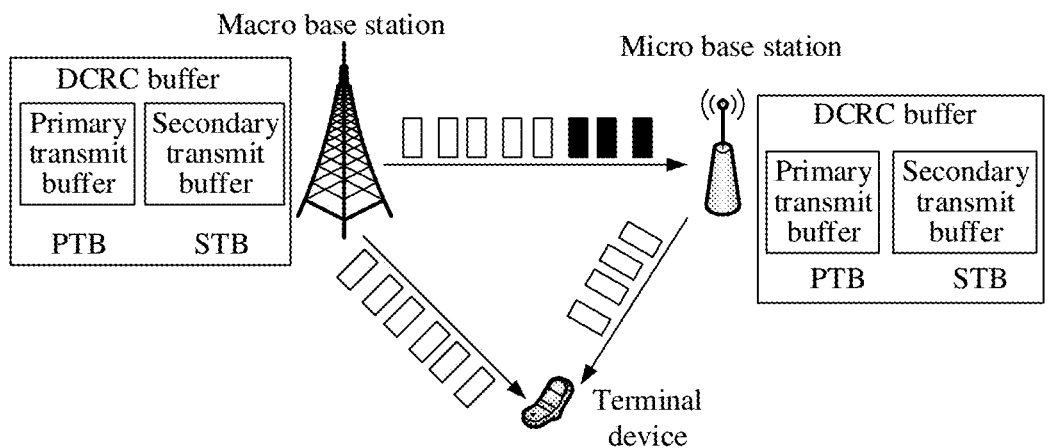
FIG. 5b is a schematic diagram at an encoding procedure at another DCRC layer according to an embodiment of the present invention.
Figure 5C:
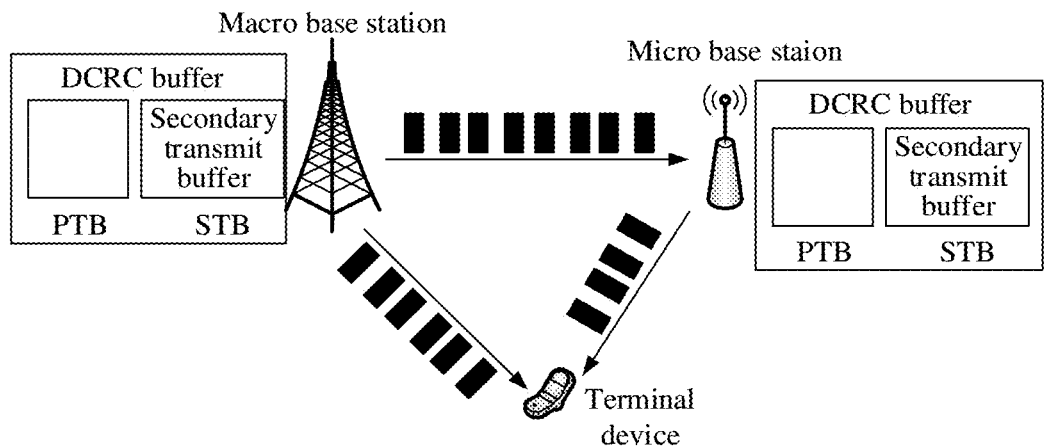
FIG. 5c is a schematic diagram of an encoding procedure at still another DCRC layer according to an embodiment of the present invention.

For example, in FIG. 5a to FIG. 5c, an example in which first access network device is a macro base station and a second access network device is a micro base station is used to describe network coding at a DCRC layer. In FIG. 5a to FIG. 5c, white boxes are used to represent first encoded data blocks, that is, encoded data blocks obtained after the network coding is performed on a first data block; and black boxes are used to represent second encoded data blocks, that is, encoded data blocks obtained after the network coding is performed on a second data block.

The DCRC layer of the macro base station and/or the micro base station has a PTB buffer and an STB buffer. The PTB buffer buffers an encoded data block obtained after the network coding is performed on the first data block, that is, a currently transmitted encoded data block. The STB buffer buffers an encoded data block obtained after the network coding is performed on the second data block, that is, an encoded data block to be transmitted next time.

As shown in FIG. 5a, the macro base station obtains the first data block from to-be-sent data, performs the network coding on the first data block to obtain a plurality of first encoded data blocks, and offloads the at least one first encoded data block in the plurality of first encoded data blocks, where a part of the at least one first encoded data block is sent to a terminal device by using the micro base station, and another part of the at least one first encoded data block is directly sent to the terminal device.

As shown in FIG. 5b, the macro base station receives a first feedback message sent by the terminal device, or the macro base station sends a predetermined quantity of first encoded data blocks. In this case, the macro base station starts to obtain the second data block, and performs the network coding on the second data block. The macro base station sends a part of the second encoded data blocks to the micro base station, and buffers a part of the second encoded data blocks in the STB buffer of the macro base station. The micro base station buffers the received second encoded data blocks in the STB buffer. To be specific, the macro base station and the micro base station buffer the second encoded data blocks in respective STB buffers, and do not send the second encoded data blocks to the terminal device.

As shown in FIG. 5c, after receiving a second feedback message sent by the terminal device, the macro base station stops sending the first encoded data blocks, and clears the first encoded data blocks buffered in the PTB buffer. After receiving the second feedback message, the micro base station also stops sending the first encoded data blocks, and clears the first encoded data blocks buffered in the PTB buffer.

At the same time, the macro base station and the micro base station send the second encoded data blocks.

In the foregoing process, encoded data blocks are transmitted on a link between the micro base station and the terminal device throughout an entire process, thereby avoiding a case in which the micro base station starts to send the second encoded data blocks after receiving the second encoded data blocks sent by the macro base station and waiting for a period of time after the micro base station stops sending the first encoded data blocks. In other words, a link between the micro base station and the terminal device is prevented from becoming idle, and a transmission delay is shortened, thereby improving transmission efficiency.

It should be noted that, after receiving a first quantity of first encoded data blocks, the terminal device may complete most decoding. Therefore, the terminal device sends the first feedback message to the macro base station. When the terminal device completely decodes the first data block, the terminal device separately sends the second feedback message to the macro base station and the micro base station. For example, the first data block is divided into 10 source symbols, and a fountain code encoder generates any quantity of first encoded data blocks. The terminal device can recover the source symbols at a great probability provided that any 13 first encoded data blocks are received, thereby obtaining the first data block. In this case, when receiving 10 encoded data blocks, the terminal device sends the first feedback message to the macro base station. The terminal device successfully recovers all the source symbols by decoding provided that any 13 encoded data blocks are received, thereby obtaining the first data block. In this case, the terminal device separately sends the second feedback message to the macro base station and the micro base station.

In addition, a decoding process of the terminal device is not described in this embodiment of the present invention, and is not limited.

Figure 6A:
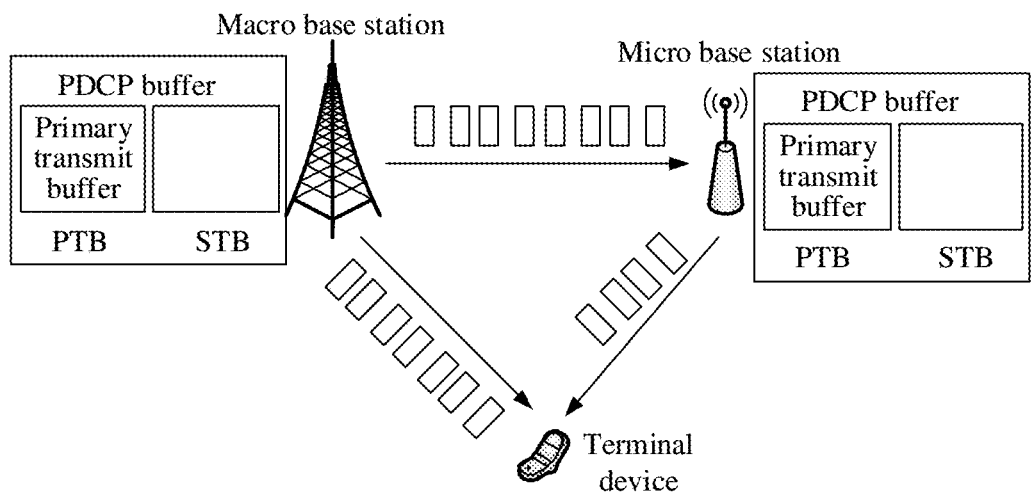
FIG. 6a is a schematic diagram of an encoding procedure at a PDCP layer according to an embodiment of the present invention.
Figure 6B:
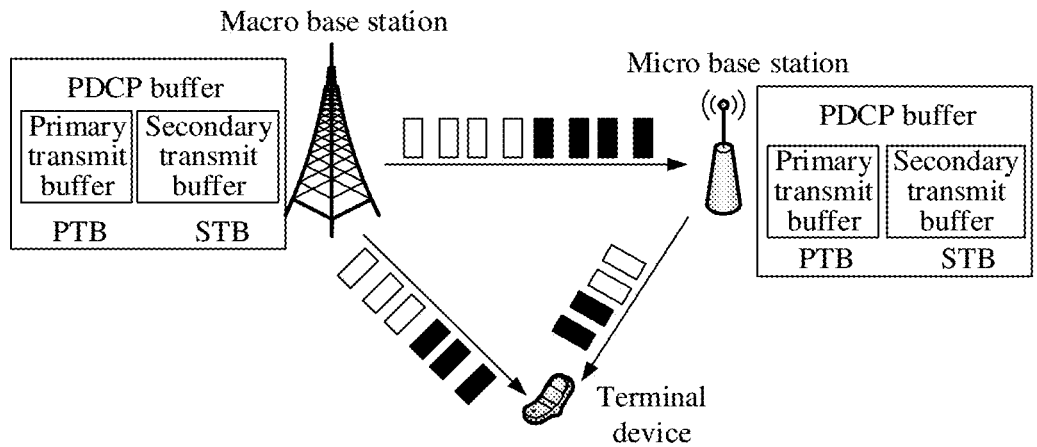
FIG. 6*b* is a schematic diagram of an encoding procedure at another PDCP layer according to an embodiment of the present invention.
Figure 6C:
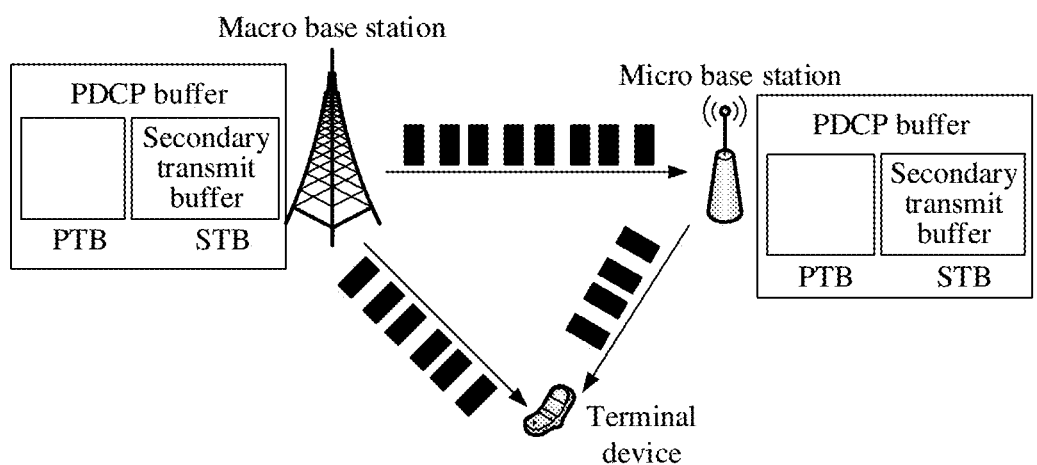
FIG. 6*c* is a schematic diagram of an encoding procedure at still another PDCP layer according to an embodiment of the present invention.

For example, in FIG. 6a to FIG. 6c, an example in which a first access network device is a macro base station and a second access network device is a micro base station is used to describe network coding performed at a PDCP layer. In FIG. 6a to FIG. 6c, white boxes are used to represent first encoded data blocks, that is, encoded data blocks obtained after the network coding is performed on a first data block; and black boxes are used to represent third encoded data blocks, that is, encoded data blocks obtained after the network coding is performed on a second data block.

As shown in FIG. 6a, the PDCP layer of the macro base station or the micro base station has a PTB buffer and an STB buffer. The PTB buffer buffers a first encoded data block, that is, an encoded data block obtained by performing the network coding on the first data block, and adding a PDCP sequence number. The STB buffer buffers a third encoded data block, that is, an encoded data block obtained by performing the network coding on the second data block, and adding the PDCP sequence number.

The macro base station obtains the first data block from to-be-sent data, performs the network coding on the first data block and adds a first sequence number to obtain a plurality of first encoded data blocks, and offloads the at least one first encoded data block in the plurality of first encoded data blocks, where a part of the at least one first encoded data block is sent to a terminal device by using the micro base station, and another part of the at least one first encoded data block is directly sent to the terminal device.

After receiving the part of the first encoded data block, the micro base station sends the received first encoded data block to the terminal device.

As shown in FIG. 6b, the macro base station receives a third feedback message sent by the terminal device, or the macro base station sends a first quantity of first encoded data blocks. In this case, after obtaining a second data block and performing the network coding on the second data block, the macro base station adds a second sequence number to obtain a plurality of third encoded data blocks. The plurality of third encoded data blocks has the same PDCP sequence number. When sending the first quantity of first encoded data blocks, the first access network device reduces a quantity of first encoded data blocks to be sent, and starts to send the third encoded data blocks to the terminal device.

As shown in FIG. 6c, after receiving a fourth feedback message sent by the terminal device, the macro base station stops sending the first encoded data block, and clears the first encoded data blocks buffered in the PTB buffer. In addition, after receiving the fourth feedback message sent by the terminal device, the micro base station also stops sending the foregoing first encoded data block, and clears the first encoded data blocks buffered in the ITB buffer. In this case, the macro base station and the micro base station are still transmitting the third encoded data blocks.

In an example, the macro base station and the micro base station may separately stop sending the third encoded data block, and separately clear the third encoded data blocks buffered in the STB buffer. In this case, the macro base station and the micro base station are still transmitting separately the first encoded data blocks.

In the foregoing process, after receiving a predetermined first quantity of first encoded data blocks, the terminal device sends a third feedback message to the macro base station. When completely decoding the first data block, the terminal device sends the fourth feedback message to the macro base station and the micro base station.

In this case, the macro base station performs the network coding on a fourth data block, and the macro base station may also send the third encoded data block and the fourth encoded data block to the terminal device by using the micro base station. In this way, a link between the terminal device and the micro base station is preventing from becoming idle, and a transmission delay is shortened, thereby improving transmission efficiency.

In addition, when sending the first encoded data block to the terminal device, the macro base station also sends the third encoded data block to the terminal device. Therefore, after performing the network coding on the first data block and the second data block, the macro base station needs to add different sequence numbers to distinguish the first encoded data block from the third encoded data block. When the terminal device obtains the first data block or the second data block through decoding, the terminal device sends, based on the sequence number, a fourth feedback message to the macro base station or the micro base station.

The foregoing mainly describes the solutions in the embodiments of the present invention from a perspective of interaction between network elements. It may be understood that, to implement the foregoing functions, each network element, such as an access network device or a terminal device, includes a hardware structure and/or a software module corresponding to each function. A person of ordinary skill in the art should easily be aware that, in combination with the examples described in the embodiments disclosed in this specification, units, algorithms steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present invention.

In the embodiments of the present invention, function unit division may be performed on the access network device, the terminal device, and the like based on the foregoing method examples. For example, each function unit may be obtained through division based on a corresponding function, or two or more functions may be integrated into one processing unit. The integrated unit may be implemented in a form of hardware, or may be implemented in a form of a software functional unit. It should be noted that, in the embodiments of the present invention, unit division is exemplary, and is merely a logical function division. In actual implementation, another division manner may be used.

Figure 7A:
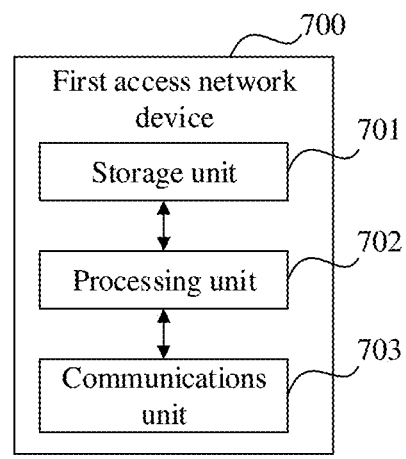
FIG. 7*a* is a schematic structural diagram of an access network device according to an embodiment of the present invention.

When an integrated unit is used, FIG. 7A is a possible schematic structural diagram of a serving gateway involved in the foregoing embodiments. An access network device 700 includes a processing unit 702 and a communications unit 703. The processing unit 702 is configured to control and manage an action of the access network device. For example, the processing unit 702 is configured to support the access network device in performing processes S401, S402 and S403 in FIG. 4, and/or is configured to perform another process of the technology described in this specification. The communications unit 703 is configured to support communication between the access network device and another network entity, for example, communication with the terminal device shown in FIG. 4. The access network device may further include a storage unit 701, configured to store program code and data of the access network device.

The processing unit 702 may be a processor or a controller, such as a central processing unit (CPU), a general-purpose processor, a digital signal processor (DSP), an application-specific integrated circuit (ASIC), a field programmable gate array (FPGA), or another programmable logical device, a transistor logical device, a hardware component, or a combination thereof. The processing unit 702 may implement or execute various example logical blocks, modules, and circuits described with reference to content disclosed in the present invention. Alternatively, the processor may be a combination of processors implementing a computing function, for example, a combination of one or more microprocessors, or a combination of the DSP and a microprocessor. The communications unit 703 may be a communications interface, a transceiver, a transceiver circuit, or the like. The communications interface is a general term, and the communications unit 703 may include one or more interfaces. The storage unit 701 may be a memory.

Figure 7B:
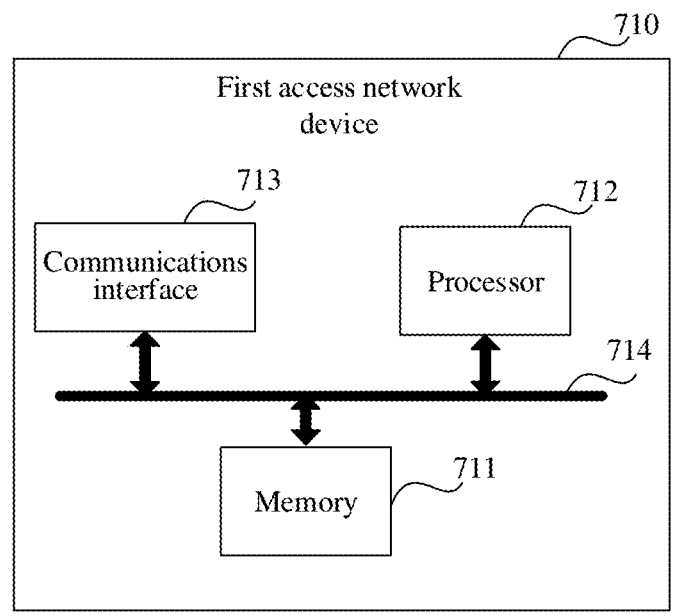
FIG. 7*b* is a schematic structural diagram of an entity of an access network device according to an embodiment of the present invention.

When the processing unit 702 is a processor, the communications unit 703 is a communications interface, and the storage unit 701 is a memory, the access network device involved in the embodiments of the present invention may be the access network device shown in FIG. 7B.

Referring to FIG. 7B, the access network device 710 includes a processor 712, a communications interface 713, and a memory 711. Optionally, a serving gateway 710 may further include a bus 714. The communications interface 713, the processor 712, and the memory 711 may be connected to each other by using the bus 714. The bus 714 may be a peripheral component interconnect (PCI for short) bus, or an extended industry standard architecture (EISA for short) bus, or the like. The bus 714 may be classified into an address bus, a data bus, a control bus, and the like. For ease of representation, only one thick line is used to represent the bus in FIG. 7B, but this does not mean that there is only one bus or only one type of bus.

Figure 8A:
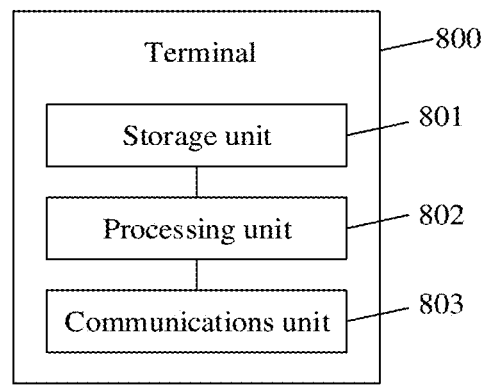
FIG. 8*a* is a schematic structural diagram of a terminal device according to an embodiment of the present invention.

When an integrated unit is used, FIG. 8a is a possible schematic structural diagram of the terminal device involved in the foregoing embodiments. The terminal device includes a processing unit 802 and a communications unit 803. The processing unit 802 is configured to control and manage an action of the terminal device. For example, the processing unit 802 is configured to support the terminal device in performing process S404 in FIG. 4, and/or is configured to perform another process of the technology described in this specification. The communications unit 803 is configured to support communication between the terminal device and another network entity, for example, communication with the access network device shown in FIG. 4. The terminal device may further include a storage unit 801, configured to store program code and data of the terminal.

The processing unit 802 may be a processor or a controller, such as may be a CPU, a general purpose processor, a DSP, an ASIC, an FPGA, or another programmable logic device, a transistor logic device, a hardware component, or any combination thereof. The processing unit 802 may implement or execute various example logical blocks, modules, and circuits described with reference to content disclosed in the present invention. Alternatively, the processor may be a combination of processors implementing a computing function, for example, a combination of one or more microprocessors, or a combination of the DSP and a microprocessor. The communications unit 803 may be a communications interface, a transceiver, a transceiver circuit, or the like. The communications interface is a general term, and the communications unit 803 may include one or more interfaces. The storage unit 8o1 may be a memory.

Figure 8B:
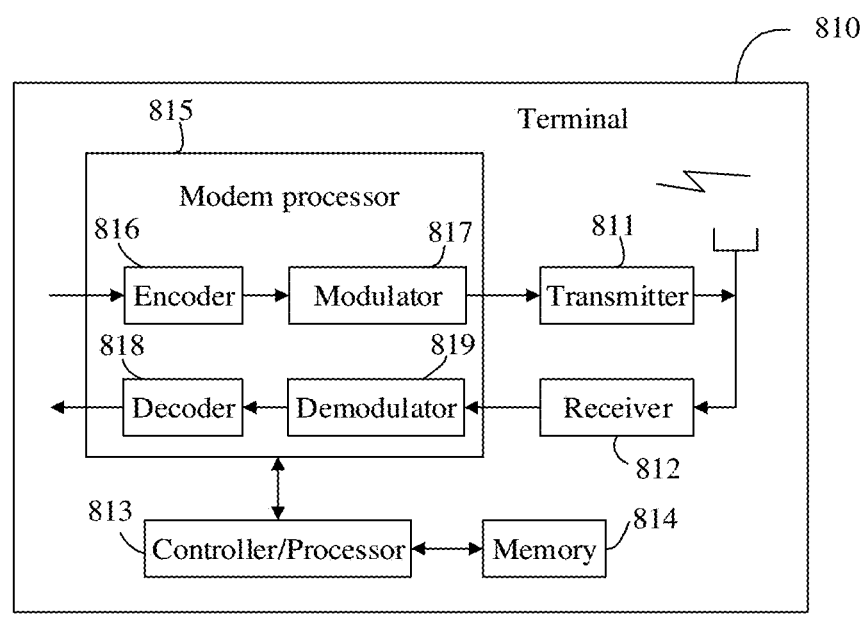
FIG. 8*b* is a schematic structural diagram of an entity of a terminal device according to an embodiment of the present invention.

When the processing unit 802 is a processor, the communications unit 803 is a transceiver, and the storage unit 801 is a memory, the terminal device involved in the embodiments of the present invention may be the terminal device shown in FIG. 8b.

FIG. 8b is a simplified schematic diagram of a possible designed structure of the terminal device involved in the embodiments of the present invention. The terminal device 81o includes a transmitter 811, a receiver 812, and a processor 813. The processor 813 may be a controller, and is represented as a "controller/processor 813" in FIG. 8b. Optionally, the terminal 810 may further include a modem processor 815, and the modem processor 815 may include an encoder 816, a modulator 817, a decoder 818, and a demodulator 819.

In an example, the transceiver 811 performs adjustment (for example, analog conversion, filtering, amplification, and up-conversion) on output sampling and generates an uplink signal. The uplink signal is transmitted to the access network device in the foregoing embodiments by using an antenna. In downlink, the antenna receives a downlink signal transmitted by the base station in the foregoing embodiment. The receiver 812 performs adjustment (for example, filtering, amplification, down-conversion, and digitization) on a signal received from the antenna and provides input sampling. In the modem processor 815, the encoder 818 receives service data and a signaling message that are to be sent in uplink, and performs processing (for example, formatting, coding, and interleaving) on the service data and the signaling message. The modulator 818 further performs processing (for example, symbol mapping and modulation) on the encoded service data and the encoded signaling message and provides output sampling. The demodulator 819 performs processing (for example, demodulation) on the input sampling and provides symbol estimation. The decoder 818 performs processing (for example, de-interleaving and decoding) on the symbol estimation and provides decoded data and a decoded signaling message that are sent to the terminal device 81o. The encoder 816, the modulator 817, the demodulator 819, and the decoder 818 may be implemented by the combined modem processor 815. The units perform processing based on a radio access technology (for example, an access technology in LTE or another evolved system) used in a radio access network. It should be noted that when the terminal device 810 does not include the modem processor 815, the foregoing functions of the modem processor 815 may be implemented by the processor 813.

Further, the terminal device 810 may include a memory 814, and the memory 814 is configured to store program code and data of the terminal device 810.

An embodiment of the present invention provides a computer storage medium, configured to store computer software instructions used by the foregoing terminal device. The computer software instructions include a program designed to execute the foregoing terminal device.

An embodiment of the present invention provides a computer storage medium, configured to store computer software instructions used by the foregoing access network device. The computer software instructions include a program designed to execute the foregoing access network device.

An embodiment of the present invention provides a computer program product, including an instruction. When the program is executed by a computer, the instruction enables the computer to perform a function performed by the foregoing terminal device.

An embodiment of the present invention provides a computer program product, including an instruction. When the program is executed by a computer, the instruction enables the computer to perform a function performed by the foregoing access network device.

The embodiments of the present invention can shorten a data transmission delay in a dual-connectivity scenario and improve a throughput of the terminal device, thereby improving transmission efficiency.

Methods or algorithm steps described in combination with the content disclosed in the embodiments of the present invention may be implemented by hardware, or may be implemented by a processor by executing a software instruction. The software instruction may include a corresponding software module. The software module may be stored in a random access memory (RAM), a flash memory, a read-only memory (ROM), an erasable programmable read-only memory (EPROM), an electrically erasable programmable read only memory (EEPROM), a register, a hard disk, a mobile hard disk, a compact disc read-only memory (CD-ROM), or any other form of storage medium well-known in the art. For example, a storage medium is coupled to a processor, so that the processor can read information from the storage medium or write information into the storage medium. Certainly, the storage medium may be a component of the processor. The processor and the storage medium may be located in the ASIC. In addition, the ASIC may be located in a terminal. Certainly, the processor and the storage medium may exist in the terminal as discrete components.

A person skilled in the art should be aware that in the foregoing one or more examples, functions described in the embodiments of the present invention may be implemented by hardware, software, firmware, or any combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

In the foregoing specific implementations, the objectives, technical solutions, and benefits of the embodiments of the present invention are further described in detail. It should be understood that the foregoing descriptions are merely specific implementations of the embodiments of the present invention, but are not intended to limit the protection scope of the embodiments of present invention. Any modification, equivalent replacement, or improvement made based on technical solutions of the embodiments of the present invention shall fall within the protection scope of the embodiments of the present invention.

What is claimed is:

1. A method, comprising:
   obtaining, by a first access network device, a first data block;
   performing, by the first access network device, network coding on the first data block to generate a plurality of first encoded data blocks, wherein performing, by the first access network device, network coding on the first data block, to generate the plurality of first encoded data blocks comprises:
   when a data volume of data packets received by the first access network device is greater than a second threshold K, using, by the first access network device, one or more of the data packets as the first data block, and performing the network coding on the first data block, wherein a data volume of the first data block is less than or equal to K; or
   when a data volume of data packets received by the first access network device is greater than a first threshold and is less than or equal to the second threshold K, using, by the first access network device, the received data packets as the first data block, and performing the network coding on the first data block; and
   performing, by the first access network device, offload processing on a first encoded data block of the plurality of first encoded data blocks, wherein the offload processing comprises:
   sending, by the first access network device, a first part of the first encoded data block to a second access network device, and directly sending, using an air interface, a second part of the first encoded data block to a terminal device.

2. The method according to claim 1, wherein the network coding comprises fountain code coding.

3. The method according to claim 1, wherein the first access network device performs the network coding on the first data block at a packet data convergence protocol layer, to generate the plurality of first encoded data blocks.

4. The method according to claim 3, wherein the first access network device performing the network coding on the first data block at the packet data convergence protocol layer, to generate the plurality of first encoded data blocks, comprises:
   the first access network device performing the network coding on the first data block, and adding a first sequence number, to obtain the plurality of first encoded data blocks, wherein the plurality of first encoded data blocks have a same first sequence number.

5. The method according to claim 4, further comprising:
   after the first access network device receives third feedback information sent by the terminal device, or after the first access network device sends a first quantity of the plurality of first encoded data blocks:
   obtaining, by the first access network device, a second data block;
   performing, by the first access network device, the network coding on the second data block, and adding a second sequence number, to obtain a plurality of third encoded data blocks; and
   sending, by the first access network device, at least a portion of the plurality of third encoded data blocks to the terminal device, wherein the plurality of third encoded data blocks have a same second sequence number.

6. The method according to claim 5, further comprising:
   receiving, by the first access network device, a fourth feedback message sent by the terminal device; and
   in response to receiving the fourth feedback message, stopping sending, by the first access network device, a third part of the first encoded data block or another portion of the plurality of third encoded data blocks;
   wherein the fourth feedback message indicates that the terminal device has correctly decoded the first encoded data block of the plurality of first encoded data blocks or a third encoded data block of the plurality of third encoded data blocks.

7. The methods according to claim 1, wherein the first access network device performs the network coding on the first data block at a dual-connectivity rateless coding layer to generate the plurality of first encoded data blocks, wherein the dual-connectivity rateless coding layer is between a radio link control layer and a packet data convergence protocol layer.

8. The method according to claim 7, further comprising:
   after the first access network device receives a first feedback message sent by the terminal device, or after the first access network device sends a first quantity of the plurality of first encoded data blocks:
   obtaining, by the first access network device, a second data block; and
   performing, by the first access network device, the network coding on the second data block, to obtain a plurality of second encoded data blocks, and buffering the plurality of second encoded data blocks.

9. The method according to claim 8, further comprising:
   receiving, by the first access network device, a second feedback message sent by the terminal device; and
   in response to receiving the second feedback message, stopping sending, by the first access network device, a third part of the first encoded data block, and starting to send the plurality of second encoded data blocks;
   wherein the second feedback message indicates that the terminal device has correctly decoded the first encoded data block of the plurality of first encoded data blocks.

10. The method according to claim 1, wherein the network coding is transmitted in a manner of an unacknowledged mode at a radio link control layer.

11. The method of claim 1, further comprising:
    after receiving, by the first access network device, a first feedback message sent by the terminal device:
    obtaining, by the first access network device, a second data block; and
    performing, by the first access network device, the network coding on the second data block, to obtain a plurality of second encoded data blocks;
    buffering a first portion of the plurality of second encoded data blocks; and
    offloading a second portion of the plurality of second encoded data blocks to the second access network device;

receiving, by the first access network device, a second feedback message sent by the terminal device, the second feedback message indicating that the terminal device has correctly decoded the first encoded data block of the plurality of first encoded data blocks; and in response to receiving the second feedback message, stopping sending, by the first access network device, a third part of the first encoded data block, and starting to send the first portion of the plurality of second encoded data blocks.

12. The method of claim 11, further comprising sending, by the first access network device, feedback information to the second access network device to cause the second access network device to buffer the second portion of the plurality of second encoded data blocks until the second access network device receives the second feedback message from the terminal device.

13. A method, comprising:
receiving, by a terminal device, a first encoded data block of one or more first encoded data blocks sent by a first access network device;
receiving, by the terminal device, a second encoded data block of one or more second encoded data blocks sent by a second access network device, wherein the one or more first encoded data blocks and the one or more second encoded data blocks are parts of a plurality at first encoded data blocks encoded from a first data block;
sending, by the terminal device in response to the terminal device receiving a first quantity of the plurality of first encoded data blocks, a first feedback message to the first access network device;
obtaining, by the terminal device, the first data block based at least in part on decoding the first encoded data block, the second encoded data block, or a combination of the first encoded data block and the second encoded data block; and
sending, by the terminal device in response to the terminal device obtaining the first data block, a second feedback message to the first access network device and to the second access network device.

14. The method according to claim 13, wherein:
the first encoded data block and the second encoded data block are obtained by performing network coding on the first data block.

15. The method according to claim 14, wherein the network coding comprises fountain code coding.

16. The method of claim 13, wherein each first encoded data block of the plurality of first encoded data blocks encoded from the first data block includes a same sequence number such that the one or more first encoded data blocks sent by the first access network device and the one or more second encoded data blocks sent by the second access network device include the same sequence number.

17. A terminal device, comprising:
a processor; and
a computer-readable storage medium storing a program to be executed by the processor, the program including instructions for:
receiving a first encoded data block of one or more first encoded data blocks sent by a first access network device;
receiving a second encoded data block of one or more second encoded data blocks sent by a second access network device, wherein the one or more first encoded data blocks sent by the first access network device and the one or more second encoded data blocks sent by the second access network device include a same sequence number such that the first encoded data block of the one or more first encoded data blocks and the second encoded data block of the one or more second encoded data blocks include the same sequence number;
sending, in response to the terminal device receiving a first quantity of the one or more first encoded data blocks or a first quantity of the one or more second encoded data blocks, a first feedback message to the first access network device; and
decoding the first encoded data block and the second encoded data block, to obtain a first data block.

18. The terminal device according to claim 17, wherein the program further includes instructions for:
sending a second feedback message to the first access network device when the terminal device decodes the first encoded data block and the second encoded data block, and obtains the first data block.

19. The terminal device according to claim 17, wherein the first encoded data block and the second encoded data block are obtained by performing network coding on the first data block.

20. The terminal device according to claim 17, wherein the first encoded data block and the second encoded data block are obtained by performing the network coding on the first data block, and adding the sequence number.

* * * * *